United States Patent [19]
Toya

[11] Patent Number: 5,289,102
[45] Date of Patent: Feb. 22, 1994

[54] BATTERY CHARGER HAVING CHARGING COMPLETION INDICATOR

[75] Inventor: Shoichi Toya, Hyogo, Japan

[73] Assignee: Sanyo Electric Co., Ltd., Osaka, Japan

[21] Appl. No.: 903,745

[22] Filed: Jun. 25, 1992

[30] Foreign Application Priority Data

Jul. 31, 1991 [JP] Japan ................................ 3-191777

[51] Int. Cl.$^5$ ............................................. H02J 7/04
[52] U.S. Cl. ........................................ 320/22; 320/31; 320/35; 320/39; 320/48
[58] Field of Search ................... 320/31, 32, 35, 36, 320/39, 40, 48, 22, 23, 24, 20

[56] References Cited

U.S. PATENT DOCUMENTS

| | | | |
|---|---|---|---|
| 3,667,026 | 5/1972 | Bogut et al. | 320/36 |
| 3,917,990 | 11/1975 | Sherman, Jr. | 320/35 |
| 4,006,397 | 2/1977 | Catotti et al. | 320/31 |
| 4,692,682 | 9/1987 | Lane et al. | 320/35 |
| 4,727,306 | 2/1988 | Misak et al. | 320/35 |
| 5,198,743 | 3/1993 | McClure et al. | 320/31 |

FOREIGN PATENT DOCUMENTS 64-19923 1/1989 Japan .

Primary Examiner—Kristine L. Peckman
Attorney, Agent, or Firm—Finnegan, Henderson, Farabow, Garrett & Dunner

[57] ABSTRACT

A battery charger includes a temperature sensor for detecting a temperature of a battery, a charge completion sensor for detecting a fully charged state of the battery, a controller for controlling the charging of the battery, and a display. The controller starts the charging of the battery when the temperature sensor detects a temperature of the battery lower than a predetermined temperature and temporarily suspends charging of the battery whenever the temperature of the battery detected by the temperature sensor rises above the predetermined temperature. When either the temperature sensor has detected a temperature above the predetermined temperature a predetermined number of times or the charge completion sensor detects the fully charged state of the battery, the controller displays a charge completion indication on the display.

6 Claims, 3 Drawing Sheets

BATTERY CHARGER HAVING CHARGING COMPLETION INDICATOR

BACKGROUND OF THE INVENTION

This invention relates to a battery charger.

A conventional battery charger includes a temperature sensor for detecting the temperature of a battery; a charging completion sensor for detecting whether a battery has been fully charged; and a means for displaying whether a battery is being charged or whether charging of a battery has been completed. With the conventional battery charger, when the temperature sensor detects that the temperature of the battery is lower than a predetermined value, the charging of the battery is carried out. Charging of the battery is suspended temporarily when the temperature sensor detects that the temperature of the battery is higher than the predetermined value. The charging of the battery is stopped when the charging completion sensor detects that the battery has been fully charged.

With respect to a secondary battery such as a nickel-hydrogen battery, the following facts have been well known in the art: A secondary battery is raised in temperature when charged. When the ambient temperature is high, then the temperature of the battery is greatly increased, which may shorten the service life of the battery. Hence, in charging such a battery, a temperature sensor is provided to detect the temperature of the battery. That is, when the temperature of the battery is abnormally raised, the temperature sensor detects this abnormal temperature rise, so that the charging of the battery is suspended. When, thereafter, the temperature of the battery is lowered to the predetermined value, the charging of the battery is restarted again. The charging of the battery, and the suspending of the charging of the battery are repeatedly carried out until the battery is fully charged. When the charging completion sensor detects that the battery has been fully charged up, the charging of the battery is finished.

As was described above, in the case where the ambient temperature is high, the battery is charged intermittently, and therefore it takes a long time of period to charge the battery completely. On the other hand, during charging, the display means displays the fact that the battery is in being charged. Hence, when compared with a standard charging time determined from a charging current and a battery capacity, the actual charging time is considerably long. This may lead the user to a misunderstanding that the charging completion sensor does not work and the battery charger runs continuously.

SUMMARY OF THE INVENTION

Accordingly, an object of this invention is to eliminate the above-described difficulties accompanying a conventional battery charger. More specifically, an object of the invention is to provide a battery charger which, even when the ambient temperature is high, displays charging conditions suitably for the user.

The foregoing object of the invention has been achieved by the provision of a battery charger comprising: a temperature sensor for detecting the temperature of a battery to be charged; a charging completion sensor for detecting that the battery has been fully charged up; and display means having a function of discriminating whether the battery is being charged or whether the battery has been charged up, in which, when the temperature sensor detects that the temperature of the battery is lower than a predetermined value, the charging of the battery is performed, and when the temperature sensor detects that the temperature of the battery is higher than the predetermined value, the charging of the battery is suspended, and when the charging completion sensor detects that the battery has been charged up, the charging of the battery is finished; in which, according to the invention, when the temperature sensor detects N times that the temperature of the battery is higher than the predetermined value, the display means displays the completion of the charging of the battery.

With the battery charger of the invention, the temperature sensor detects the temperature of the battery during the charging. When the temperature of the battery is higher than the predetermined value, the charging of the battery is suspended; that is, a pause period occurs. When the battery temperature becomes lower than the predetermined value during this pause period, the charging of the battery is performed again. When, while the battery is charged intermittently in the above-described manner, the temperature sensor detects N times that the battery temperature is higher than the predetermined value, the display means displays the completion of the charging of the battery; however, the charging of the battery is kept continued. When the charging completion sensor detects that the battery has been fully charged up, the charging of the battery is finished.

DETAILED DESCRIPTION OF THE PREFERRED EMBODIMENTS

Figure 1:
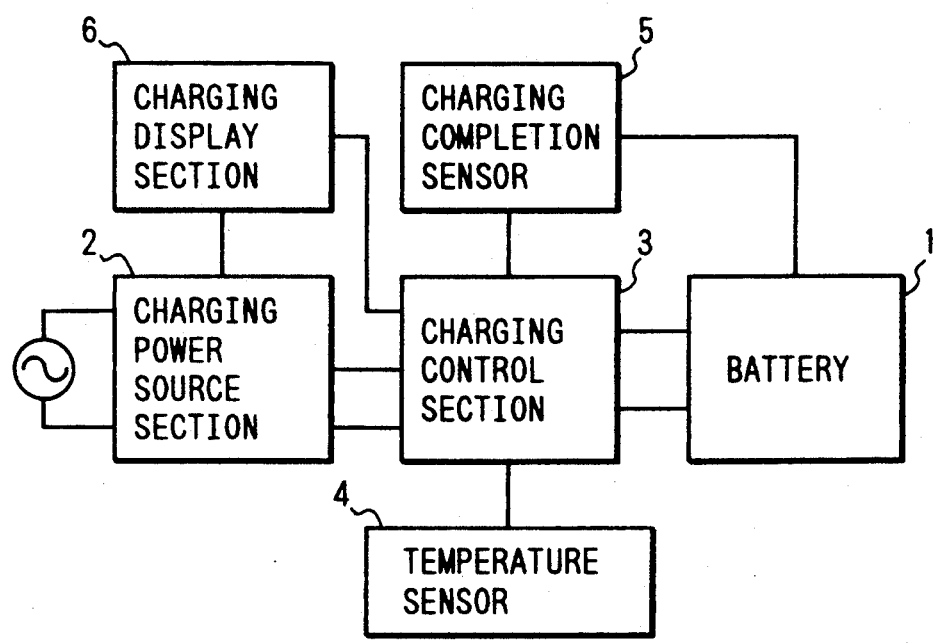
FIG. 1 is a block diagram showing the arrangement of a battery charger according to this invention.

One preferred embodiment of this invention will be described with reference to the accompanying drawings.

A battery charger according to the invention comprises: a charging power source section 2 which rectifies commercial alternating power to supply charging current to a nickel-hydrogen battery 1; a charging control section 3 for controlling the supply of charging current from the charging power source to the battery 1; a temperature sensor 4 for detecting the temperature of the battery 1; a charging completion sensor 5 which detects the voltage of the battery, and applies a charging completion signal to the charging control section 3 when the voltage of the battery being charged reaches a peak value; and a charging display section 6 having a function of discriminating whether the battery is being charged or whether it has been charged up.

Figure 4:
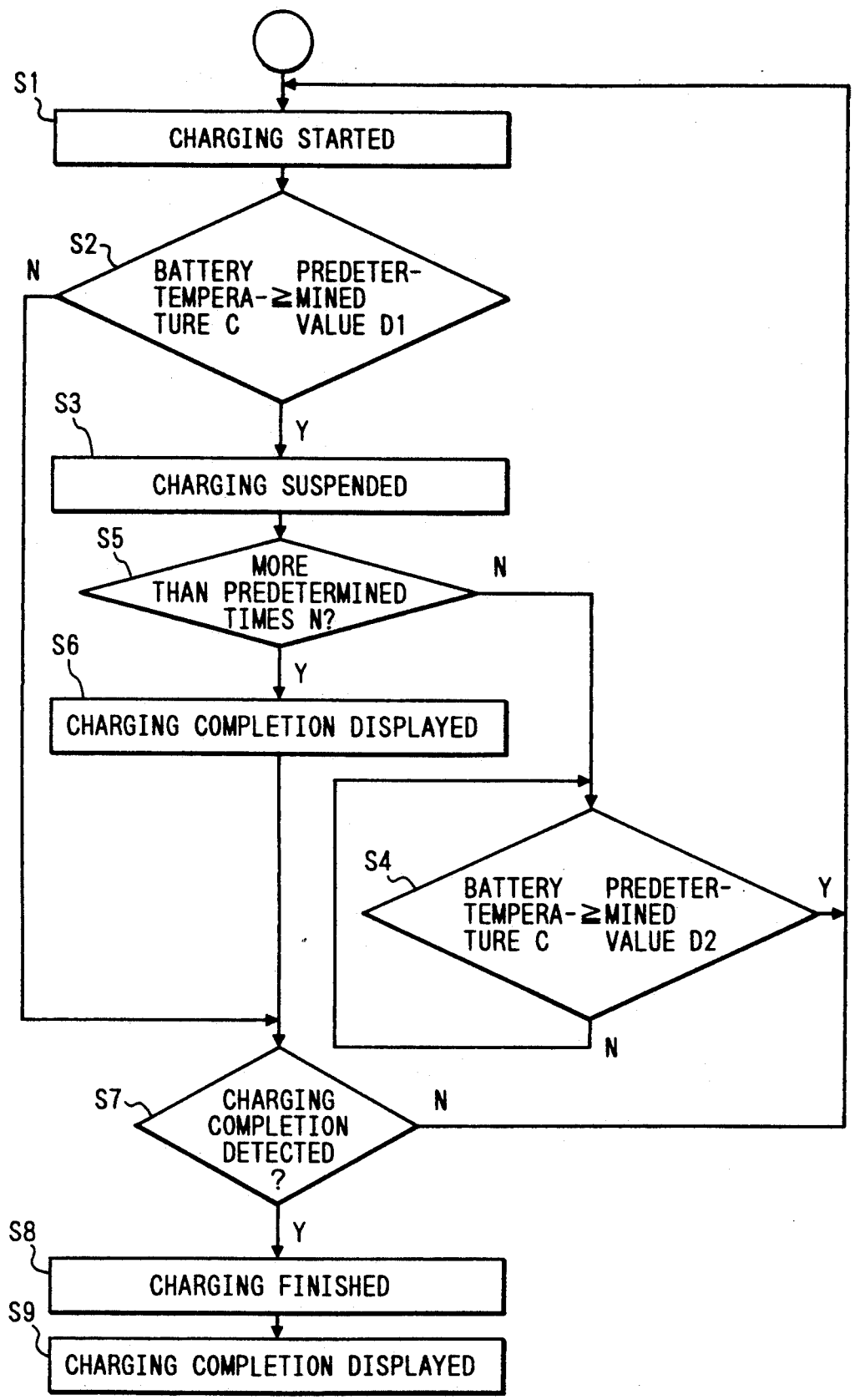
FIG. 4 is a flowchart showing an operation of the battery charger according to the present invention.

The operation of the battery charger thus organized will be described with reference to the flowchart of FIG. 4. When charging the nickel-hydrogen battery 1 by the battery charger is started (step S1), charging current is supplied from the charging power source section 1 to the battery 1. In this case, the charging display section 6 displays the fact that the battery is being charged. On the other hand, the temperature sensor 4 detects the temperature of the battery 1, while the charging completion sensor 5 detects the voltage of the battery 1. When the charging completion sensor 5 detects that the voltage of the battery has reached the peak value (step S7), the charging of the battery is finished (step S8) and the charging display section 6 displays the fact that the battery has been charged up (step S9). The temperature sensor 4 has a first predetermined value, and a second predetermined value lower than the first predetermined value. When the temperature of the battery has reached the first predetermined value during charging (step S2), the temperature sensor 4 detects it, and applies a signal to the charging control section 3, so that the latter 3 operates to interrupt the charging current, to suspend the charging of the battery (step S3); that is, a pause period occurs; however, the charging display section 6 still displays the fact that the battery is being charged. When, during this pause period, the voltage of the battery decreases, and the temperature of the battery is lowered to the second predetermined value (step S4), the temperature sensor 4 detects it and applies a signal to the charging control section 3, so that the charging of the battery is restarted again (step S1). In this case, the charging display section 6 still displays the fact that the battery is being charged.

When, while the battery is charged intermittently, the temperature sensor 4 detects N times that the battery temperature has reached the first predetermined value (step S5), the display section 6 displays the fact that the battery has been charged up (step S6); however, the charging of the battery is continued. When the charging completion sensor 5 detects that the battery voltage has reached the peak value (step S7), the charging of the battery is finished (step S9).

Figure 2:
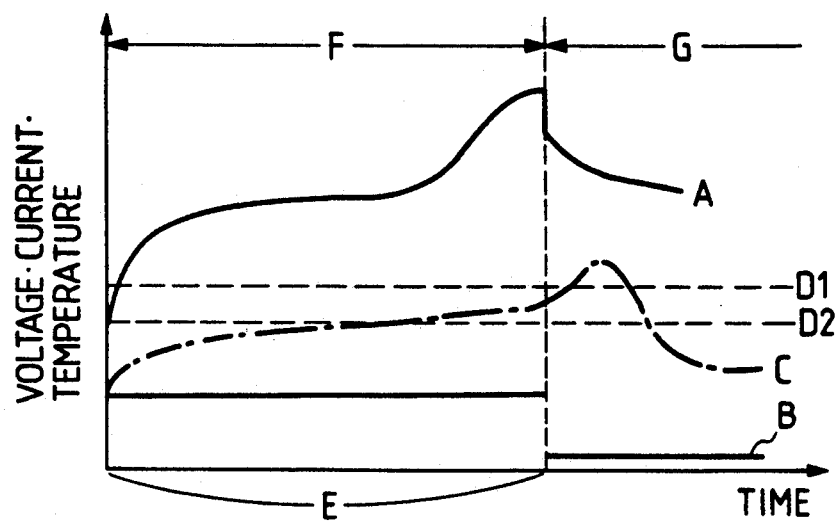
FIG. 2 is a graphical representation showing charging characteristics of a nickel-hydrogen battery at an ambient temperature of 20° C.
Figure 3:
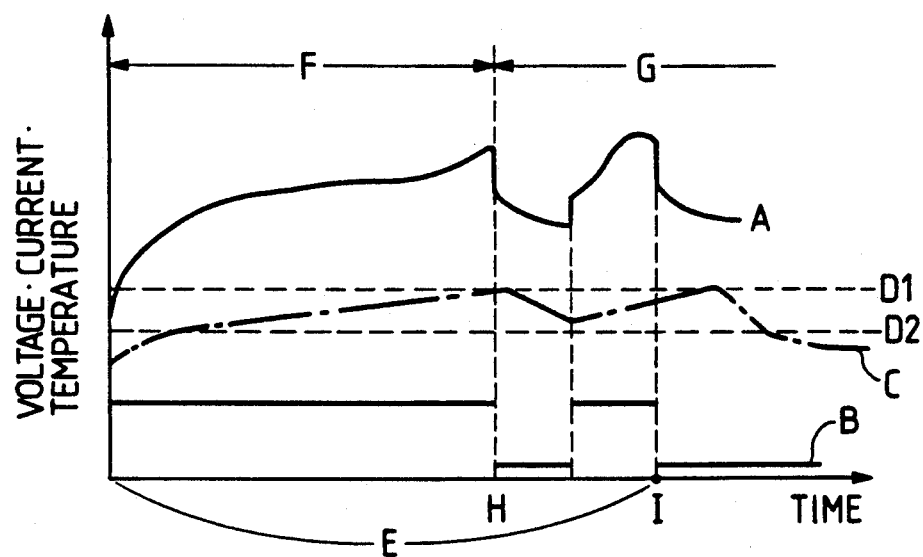
FIG. 3 is also a graphical representation showing charging characteristics of a nickel-hydrogen battery at an ambient temperatures of 40° C.

FIGS. 2 and 3 show one-hour rate charging characteristics of nickel-hydrogen batteries at ambient temperatures of 20° C. and 40° C., respectively.

In the case where the ambient temperature is 20° C., before a battery temperature C reaches the first predetermined value D1, the battery voltage A reaches the peak value. Therefore, the supply of the charging current B is stopped, and the charging of the battery is finished. In this case, the charging time is as indicated by E in FIG. 2. The display section 6 displays the fact that the battery is being charged, for a period of time F in FIG. 2, and displays the fact that the battery has been charged up, for a period of time G. As is apparent from the above description, the charging of the battery is finished without operation of the temperature sensor 4.

In the case where the ambient temperature is 40° C., before the battery voltage A reaches the peak value, the battery temperature C reaches the first predetermined value D1, and the charging of the battery is suspended; that is, a pause period occurs. During this pause period, the battery temperature decreases. When the battery temperature reaches the second predetermined value D2, the charging of the battery is restarted again. The battery is charged in this manner, and when the battery voltage has reached the peak value, the charging of the battery is finished. In this case, the charging time is as indicated by E in FIG. 3, and the display section 6 displays the fact that the battery is being charged, for a period of time F in FIG. 3, and displays the fact that the battery has been charged up, for the period of time G. As is seen from the above description, in the case where the ambient temperature is 40° C., the charging of the battery is finished with the temperature sensor 4 operated once.

When, in the above-described embodiment, the temperature sensor detects that the battery temperature exceeds the first predetermined value once, the display section 6 displays the fact that the battery has been charged up. When the battery temperature exceeds the first predetermined value once; that is, at the time instant H in FIG. 3, the charging time E in FIG. 2 has passed substantially, and the battery has been charged about 80%. Therefore, at this time instant, the completion of charging the battery may be displayed to inform the user so. In this case, the charging of the battery is kept performed. However, even if the user disconnects the battery from the charger at this time instant, use of the battery will cause no trouble, because the battery has been charged about 80%. If the battery is not disconnected, it is kept charged as it is. When the battery has been fully charged, the charging is finished.

If, as in the prior art, the display that the battery is being charged is made until the actual charging completion time instant (I in FIG. 3), then the charging time is longer than the standard (one-hour rate) time, which may lead the user to a misunderstanding that the charger runs away. On the other hand, with the battery charger of the invention, while the completion of charging the battery is displayed at the time instant H in FIG. 3, the charging of the battery is continued. Thus, the charging of the battery can be achieved without misleading the user.

With the battery charger of the invention, when the ambient temperature is high, the temperature sensor operates so that the charging of the battery is suspended. Even if the charging time is long, the completion of charging is displayed before the battery has been charged up. Therefore, the battery charger of the invention is free from the difficulty that the user is led to a misunderstanding that the charger runs away. Furthermore, even after the completion of charging is displayed, the charging of the battery is continued, so that the battery can be fully charged.

What is claimed is:

1. A battery charger comprising:
   a temperature sensor for detecting a temperature of a battery;
   a charging completion sensor for detecting a fully charged state of said battery;
   means for controlling a charging of said battery, said controlling means starting the charging of said battery when said temperature sensor detects a temperature of said battery lower than a predetermined temperature, said controlling means temporarily suspending the charging of said battery when said temperature sensor detects a temperature of said battery higher than said predetermined temperature, and said controlling means stopping the charging of said battery when said charging completion sensor detects said fully charged state of said battery;
   means for displaying a charging completion indication when said temperature sensor detects a temperature of said battery higher than said predetermined temperature a predetermined number of times and
   when said charging completion sensor detects said fully charged state of said battery.

2. A battery charger as claimed in claim 1, further comprising a charging power source for rectifying commercial alternating power to supply a charging current to said battery.

3. A battery charger comprising:
   a temperature sensor for detecting a temperature of a battery;
   a charging completion sensor for detecting a fully charged state of said battery;
   means for controlling a charging of said battery, said controlling means suspending the charging of said battery when said temperature sensor detects a temperature of said battery higher than a first predetermined temperature, said controlling means restarting the charging of said battery when said temperature sensor detects a temperature of said battery lower than a second predetermined temperature, said second predetermined temperature being lower than said first predetermined temperature, and said controlling means stopping the charging of said battery when said charging completion sensor detects said fully charged state of said battery; and
   means for displaying a charging completion indication when said temperature sensor detects a temperature of said battery higher than said first predetermined temperature a predetermined number of times.

4. A battery charger as claimed in claim 3, further comprising a charging power source which rectifies commercial alternating power to supply charging current to said battery.

5. A battery charger comprising:
   a charging power source for supplying a charging current to a battery;
   a temperature sensor for detecting a temperature of the battery; and
   means for controlling the battery charger, said controlling means including:
      means for starting the charging of the battery when the temperature sensor detects a temperature below a predetermined temperature;
      means for suspending the charging of the battery when the temperature sensor detects a temperature of the battery above the predetermined temperature;
      means for restarting the charging of the battery when the temperature sensor detects a temperature of the battery below the predetermined temperature; and
      means for displaying a charging completion indication when charging of the battery has been suspended a predetermined number of different times.

6. The battery charger according to claim 5 further comprising
   a charging completion sensor for detecting said fully charged state of said battery, and wherein said means for displaying a charging completion indication displays said charging completion idication when charging of the battery has been suspended a predetermined number of different times and when said charging completion sensor detects said fully charged state of the battery.

* * * * *